United States Patent Office 2,782,457
Patented Feb. 26, 1957

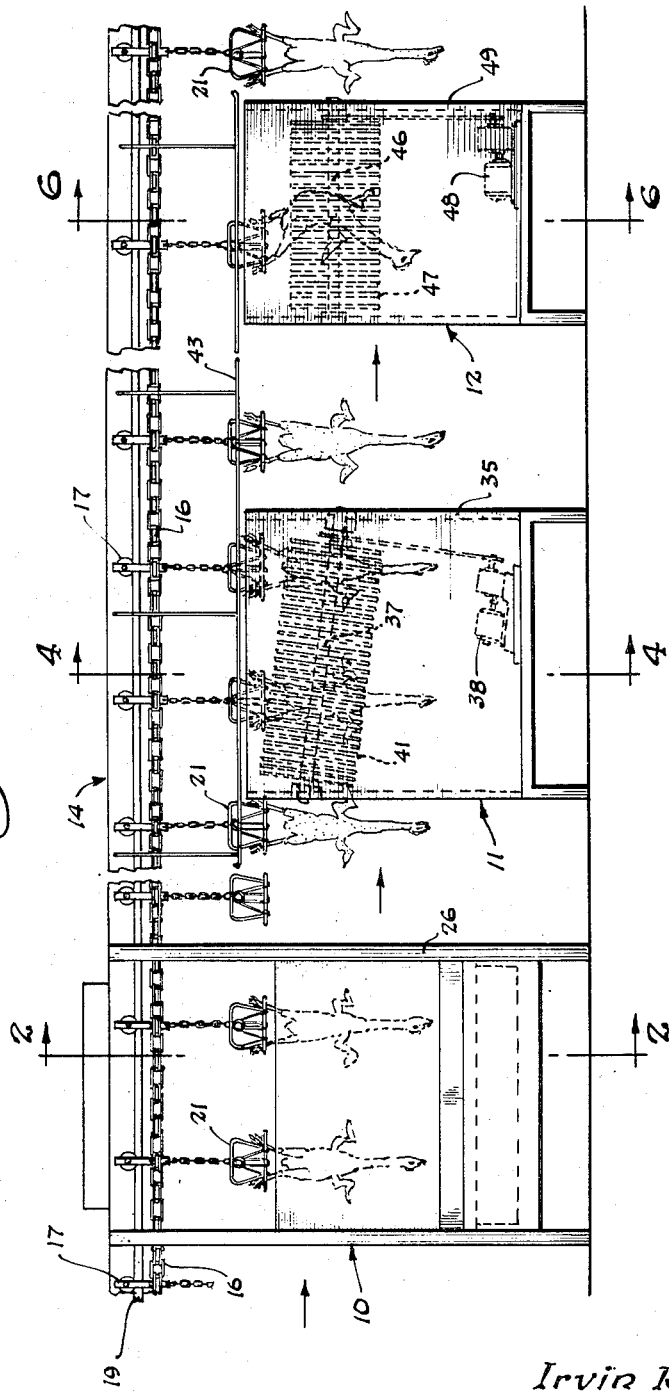

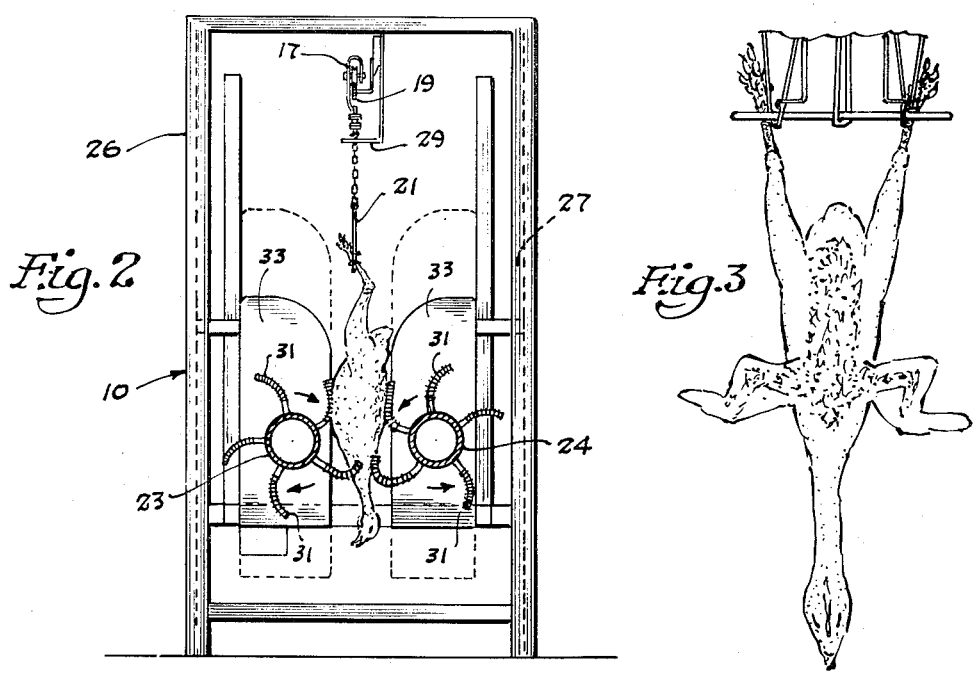
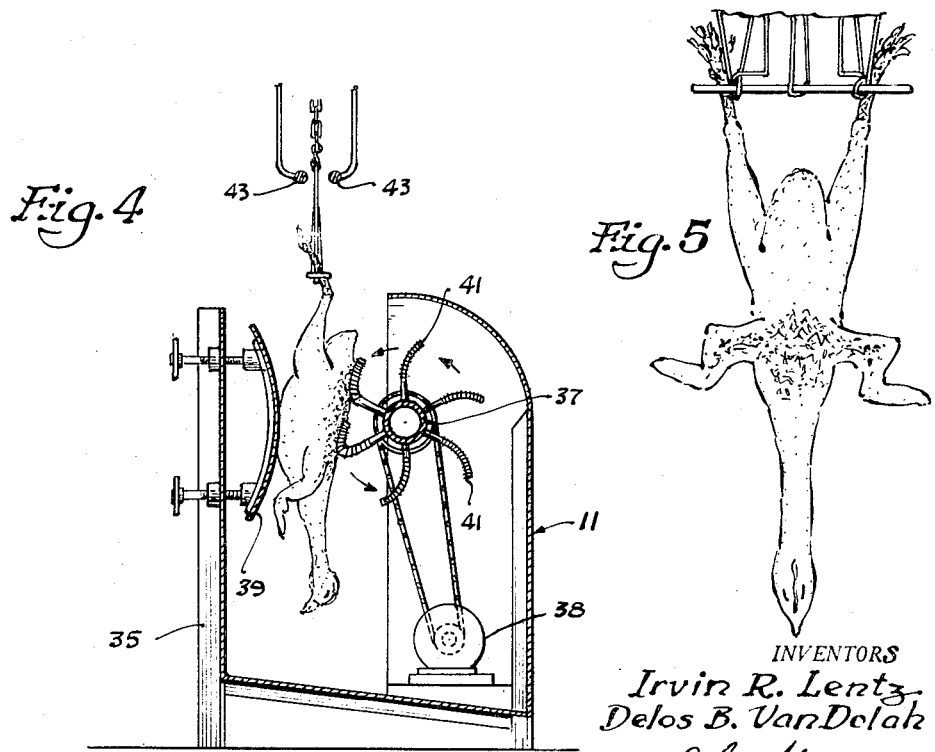

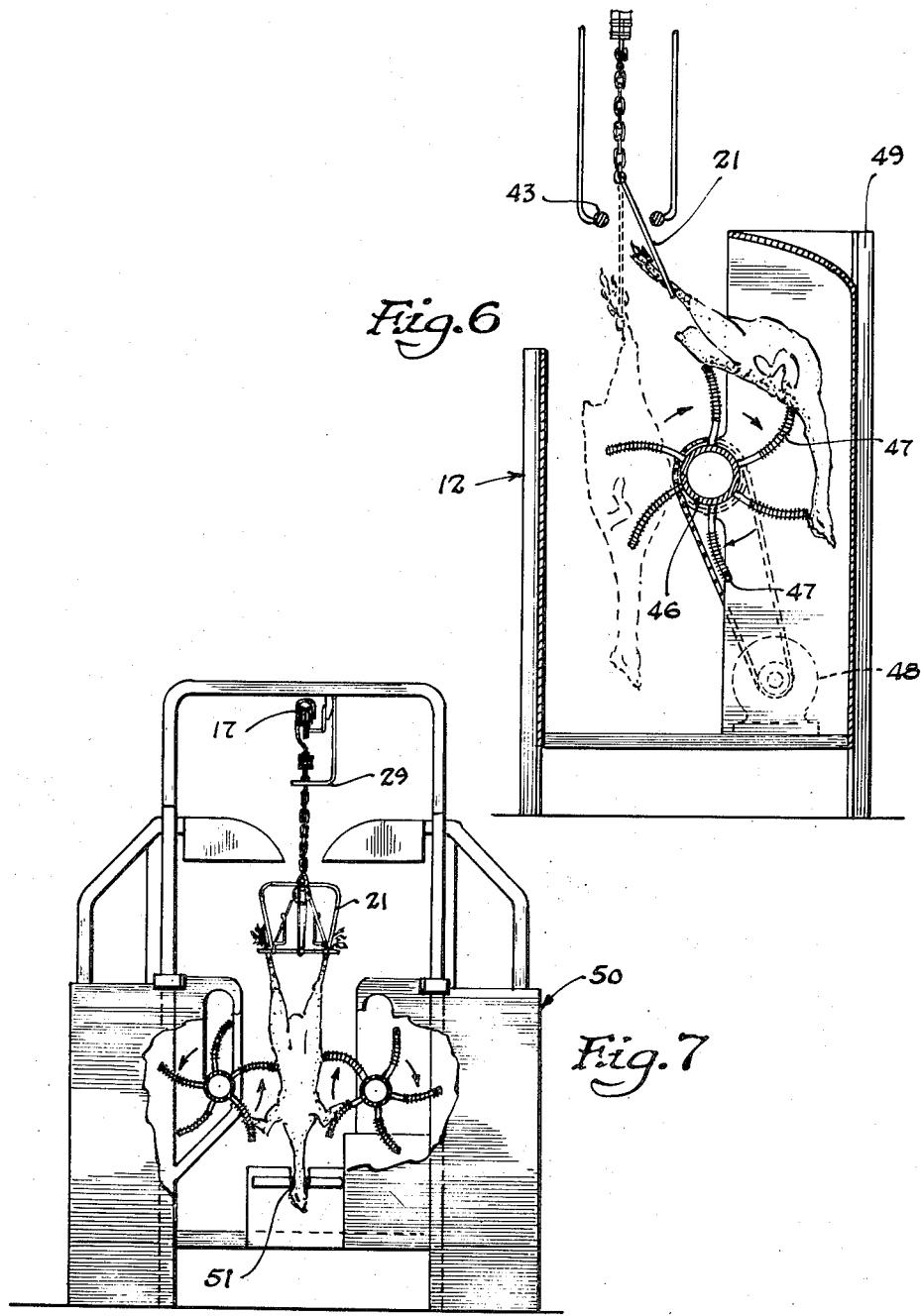

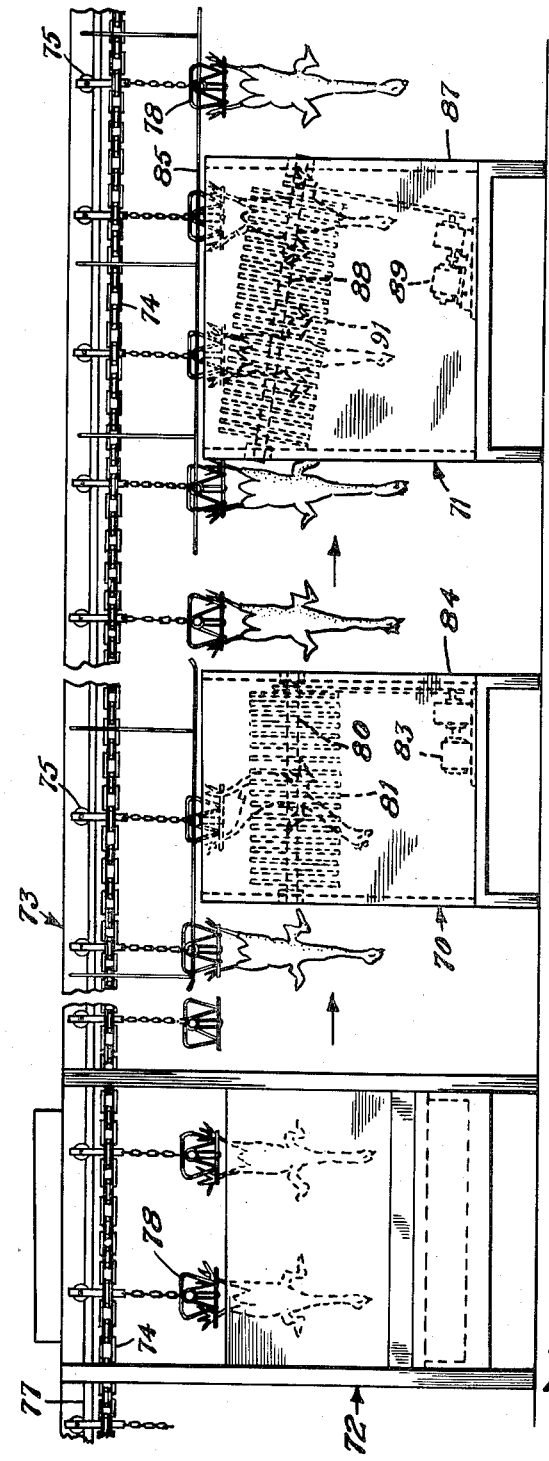

2,782,457

POULTRY PICKING METHOD

Irvin R. Lentz and Delos B. Van Dolah, Chicago, Ill., assignors to Swift & Company, Chicago, Ill., a corporation of Illinois Application November 4, 1952, Serial No. 318,604

6 Claims. (Cl. 17—45)

This invention relates to the picking of poultry and provides improved apparatus and methods for removing feathers from poultry.

In the use of conventional picking machines it has been found that a portion of the backside of the poultry is not thoroughly contacted by the picking means of the machine. For example, when the poultry is suspended from its feet in the picking operation, the back of the poultry and the backs of the wings are not effectively contacted by the picking fingers and as a result a substantial amount of feathers are left on these portions of the body.

The conventional commercial mechanical pickers have two revolving drums equipped on their circumferences with picking means, such as rubber fingers which whip against the body of the poultry and remove the feathers. The poultry pass between the revolving drums. The picking drums rotate one in clockwise direction and the other in a counterclockwise direction, whereby a downward pull is exerted on the feathers. When the birds are suspended from the feet the downward strokes of the fingers are not effective for contacting the back and the backs of the wings. Consequently, there are always patches of feathers left on these portions of the carcass. The amount of the remaining feathers will depend on the type and age of the bird. It is often necessary for some feathers to be removed by a hand operation as the birds emerge from the picking machine, and the remainder finally removed by a waxing operation.

It has been proposed, as described in the patent issued to E. M. Davis, U. S. No. 2,469,953, to remove these remaining feathers by subjecting the fowl to the action of a second picking machine but wherein the bird is suspended from its head rather than its feet as in the first machine. The Davis operation, while effective in removing the feathers, has the disadvantage that before passing the bird into the second machine it is necessary to reverse the position of the bird by interchanging the positions of the head and feet.

Another method of operation to remove the backside feathers remaining after defeathering in the conventional machine involves the use of an upsweep machine in the dressing operation immediately succeeding a conventional downsweep machine. The upsweep machine differs principally from the conventional machine in that the picking drums sweep upwardly over the carcass of the birds. The upward motion of the drums over the surface of the bird tends to move the bird upward and out of contact with the picking fingers. To prevent this, the heads of the poultry which are carried down are held by a head holder. Unfortunately, a carcass is occasionally decapitated by the head holder, resulting in a damaged bird.

An object of the present invention is to provide an improved method of picking poultry, and particularly a method that will assure the removal of all feathers from the back and wings with a minimum of damage to the carcass.

Another object is to simplify the equipment and to permit the use of less expensive machines, thereby lessening upkeep and initial cost of equipment.

Another object is to provide equipment and a method of operation which will permit high speed operation of the dressing line.

Another object is to provide apparatus and a method of operation that will lessen the required amount of manual labor.

The present invention broadly contemplates a method of defeathering poultry which comprises first subjecting the whole carcass to a mechanical picking operation and thereafter applying a second mechanical picking force only to the backside of the carcass. It will be desirable to apply a third mechanical picking force to the backside of the carcass to assure complete feather removal, in some instances.

In a preferred embodiment of the invention, the whole carcass is subjected to a revolving picking force, followed by a downwardly revolving picking force applied solely to the backside of the carcass, and thereafter the back of the carcass is subjected to a third revolving picking force adapted to support the carcass from below while the carcass moves the length of the force. As alternatives, in some instances it may be desirable for the first picking force to be followed by a single one of the back picking forces, or to interchange the two back picking forces in sequence.

In the practice of the methods of the invention, some conventional equipment is used along with the apparatus of the invention. One machine of our invention which facilitates the defeathering operation is a slant-drum, back picking machine which includes a frame and a single, inclined drum rotatably mounted in the frame, with one of its ends at a higher elevation than the other. A plurality of flexible picking fingers project outwardly from the drum. Means are provided for transporting the carcass the length of the machine, and aligning means are provided to position the backside of the carcass toward the revolving fingers. A member spaced from the drum and the fingers holds the carcass in contact with the revolving fingers.

A second back-picking machine of our invention includes a single horizontal drum provided with outwardly projecting picking fingers. This machine, like the preceding, includes means for positioning the backside of the carcass to the rotating drum. This machine is designed to remove feathers from the backside of the carcass while supporting the carcass on the revolving fingers.

The invention will be more fully understood from the following description read in connection with the accompanying drawing:

Figure 1 shows one embodiment of the invention utilizing in succession a conventional downsweep picker to the far left of the figure, a slant-drum back picker, and a horizontal-drum back picker.

Figure 2 is a vertical section taken along line 2—2 of the downsweep picker of Figure 1.

Figure 3 is an enlarged view of a bird which has passed through the downsweep picking machine, showing unremoved feathers on its back and its two wings.

Figure 4 is a cross-section through the slant-back picker of Figure 1.

Figure 5 is an enlarged view of a bird which has passed through the slant back picker, showing feathers remaining on the upper back and the two wings.

Figure 6 is a cross-section taken along line 6—6 of Figure 1, showing the horizontal-drum back picker in option.

Figure 7 is a side elevation, partly cut away, of a conventional upsweep machine.

Figure 8 illustrates another embodiment of the invention employing the machines of Figure 1 but wherein the order of the machines has been changed to place the horizontal drum back picker intermediate of the three machines and the slant drum back picker as the last machine in the series.

In Figure 1 there are shown in succession from left to right a conventional downsweep picker 10, in the center portion a slant-drum back picker 11, and to the far right a horizontal-drum back picker 12. The birds are moved progressively from left to right by a conveyor system 14 made up of a horizontal chain 16 supported by several trolleys 17 on a track 19. The trolleys and chain are moved at a uniform rate by a source of power not shown. Detachable shackles 21 adapted for carrying birds are hooked at intervals on the conveyor chain. The shackles may be of any well-known type. A shackle contemplated is that shown and described in the Van Dolah Patent 2,632,201, or a modification thereof. The downsweep picking machine of Figures 1 and 2 may be of the type shown in the Barker patent, U. S. No. 2,328,770.

The downsweep picking machine illustrated is of the automatic type and includes a pair of parallel horizontal rotors 23, 24 (see Fig. 2) and a means for automatically elevating the rotors at intervals into a picking position. The rotors are automatically raised at intervals to accomplish the picking as the birds travel continuously along the conveyor line. The picking machine has a frame 26, the vertical sections of which composed a track or guide 27 for elevating the rotors. The movement of the rotors up and down is governed by a switch 29 (Fig. 2) which is actuated by contact with the several shackles of the conveyor. Thus, the shackle of the birds entering the picking machine trip the switch whereby the rotors move upward for a predetermined interval of time and thereafter receding out of the picking position. The rotors each carry several outwardly projecting fingers 31 of flexible material such as rubber and are driven by a motor (not shown). One of the rotors travels in a clockwise and the other in a counterclockwise direction so that the picking fingers strike downwardly on the bird, thereby exerting a pulling action on the feathers. The rotors may be mounted in a housing 33 to catch the feathers so that they will fall substantially below the picking machine. The birds leaving this picker have feathers remaining on portions of the back and on the wings, as shown in Figure 3.

The fowl following the defeathering operation in the first machine pass along the conveyor to the second defeathering machine which is the single drum slant picker. The slant picker consists of a frame 35 (Fig. 4), an inclined longitudinal drum 37 rotatably supported at its opposite ends by the frame, a motor 38 for driving the drum, and a shield 39 spaced from the drum.

The drum carries a plurality of flexible picking fingers 41 made, for example, of rubber. The drum is preferably of relatively small diameter and the rubber fingers are shorter and stiffer than those of the regular automatic picking machine previously described. The drum is inclined to permit removal of feathers from all of the lower back of the carcass (see Fig. 5), which, without the incline, would not be completely covered by the fingers, because of the relatively small diameter drum and the short fingers. The bird out of the first defeathering machine has considerable feathers remaining on the back and on the wings, as shown in Figure 3. After the carcass has been exposed to the picking action of the slant drum back picker 11 (Figure 4), the carcass is in the condition illustrated in Figure 5. The area of the carcass which is covered with considerable feathers immediately following the slant drum picker 11 is the upper back and the wings adjacent thereto. The lower back is the portion of the bird which is cleaned of feathers in the passage of the carcass through the slant drum picker, and as will be seen with reference to Figure 5, the lower back adjoins the tail area of the bird and is the upper portion of the bird when it is freely suspended by its legs from a shackle in the manner illustrated in Figure 5. It should be noted that the area of picking contact of the fingers is of a width considerably less than the diameter of the drum and that the drum, unlike the drums of the preceding picker, is not free to move up and down within the frame. For these reasons, the area of carcass covered by the picking fingers is relatively small.

In passing through this second picker it is necessary, in order to remove feathers with the single drum, that the fowl be so positioned that only its back side will be exposed to the picking action of the fingers. This is accomplished through the use of two light parallel rods 43 which are spaced apart a distance less than the width of a shackle and which extend along the conveyor line at shackle height from a point between the first and second picker to beyond the third picker. The several shackles, in moving along the conveyor line, pass between the parallel rods. The rods, being spaced apart a distance less than the width of a shackle, prevent the shackles from turning, thereby assuring that only the backs of the birds are facing the revolving drum.

The shield 39 which is a metal plate holds the carcass in contact with the revolving fingers of the drum. Two threaded rods 44 fastened to the shield and extending through holes of the frame permit the adjustment of the position of the shield relative to the drum. The operation of this first back picker effectively removes all of the feathers from the lower half of the back of the carcass. To remove the few remaining feathers, we prefer to pass the bird through a second back picker.

The second back picker (Figs. 1 and 6) includes a single, horizontally-supported drum 46 which carries a plurality of flexible picking fingers 47. The horizontal drum is driven by a motor 48 and is rotatably supported at its opposite ends by a frame 49. The drum may be of the type described in the Mead Patent 2,484,235. As in the case of the preceding back picker, it is necessary that only the back side of the carcass be stroked. To accomplish this, the guide rails described for use with the first back picker are continued past the second back picker. The second back picker is rotated in such a direction as to cause the bird to ride over the top of the drum and bounce around on the fingers until all of the remaining feathers are removed; that is to say, the drum and fingers support the carcass from below while the carcass is conveyed the length of the drum. The fowl emerging from this last picker are wholly clean of feathers and require no waxing operation. It will be seen in Figure 6, that the longitudinal axis of the second back picker's rotating drum does not lie in the vertical plane of the overhead conveying line, but is disposed parallel of the conveying line a short distance to one side. The suspended carcass approaches the second back picker with the breast of the bird adjacent the revolving fingers and the carcass is lifted up by the fingers of the drum which is revolved in an upwardly direction of the length of the bird. This results in the carcass being carried upwardly and disposed on the top side of the revolving drum with its back in contact therewith, where it continues its lineal movement. The back of the bird is thus subjected to a "lateral" picking action. By this we mean that the picking force is applied in a largely horizontal plane, in a direction transverse of the conveyor movement and away from the vertical plane which can be visualized as extending downwardly from the conveyor line. The two parallel rods 43 hereinbefore described prevent the shackle from turning and thereby assure that only the backs of the birds contact the top of the revolving drum. The rotating horizontal drum of Figure 6 is contained in a small compartment which has side walls closely spaced to the drum, parallel of its length.

Different combinations of the above-described picking machines may be used. Either of the previously described back picking machines may be used singly with the conventional downsweep machine of Figure 2. Depending on the size of the back picking machine used and the size of the bird, it may be necessary to remove some feathers by hand when employing a single machine. Another possible combination interchanges the positions of the two back picking machines. In this combination the horizontal drum machine would precede slant drum machine as illustrated in Fig. 8 which is described subsequently.

As an alternative to the second back picking machine of Fig. 1, a conventional upsweep machine 50 of the type illustrated in Fig. 7 may be employed. In passing through the upsweep machine, the neck of the bird is inserted in a longitudinal slot 51 and held there by its head while the carcass is moved the length of the machine during the defeathering operation. The picking fingers of the spaced parallel drums of this machine sweep upward over the carcass of the bird rather than downward as in the case of the downsweep machine of Fig. 2. The shackled fowl passing through this machine is free to rotate, exposing substantially all of the carcass to the picking fingers. In other essential details, the upsweep machine resembles the downsweep machine described in conjunction with Fig. 2. This alternative is particularly useful where the combined defeathering operation of the conventional upsweep and downsweep machines is inadequate to remove all feathers from the back of the fowl. The addition of a back picker, either the slant or the horizontal drum types, to the operation will effectively remove all feathers. The pickers may be arranged in any desired sequence.

In practicing the invention, birds from the scalding tank (not illustrated) are conveyed to the first picking machine. In the embodiment illustrated and described, this machine is a conventional downsweep picker. However, it should be understood that the described back picking machines will defeather the backside of any fowl, whether the fowl has been first processed in a downsweep machine or other machine, such as an upsweep. The bird passing through this first picking operation will have some feathers left on its backside.

Following the first operation, the bird is passed through the slant drum picking machine. The slant drum machine described effectively removes the feathers from the lower back of the carcass (the lower back, with the bird hanging as in Fig. 5, is the upper portion of the carcass). This machine does not ordinarily remove all feathers remaining on the backside of the fowl, and consequently it is desirable to pass the carcass through the third picking operation of the single horizontal drum-type machine.

The horizontal drum back picker is rotated in a direction as to cause the bird to ride over the top of the drum. The picking fingers of the drum support the carcass from below while the carcass is conveyed the length of the drum. The fowl emerging from this last picker are clean of feathers.

The modification of Figure 8 resembles that of Figure 1 with the difference being that the two back picking machines of Figure 1 have been interchanged so that a horizontal back picking machine 70 precedes a slant drum back picking machine 71. The horizontal back picking machine 70 is of the type illustrated in Figure 6, and the slant drum picker is the one illustrated in Figure 4. The machine 72, to the far left side of Figure 8, is a conventional downsweep picker of the type disclosed in Figure 2. The birds are passed from left to right by a conveyor system 73 which comprises a horizontal chain 74, supported by several trolleys 75, on a track 77. The detachable shackles 78 which carry the birds are hooked at spaced intervals to the conveyor chain. The downsweep picking machine operates in a fashion described before and the fowl, following the defeathering operation in the first machine, is carried by the conveyor to the second defeathering machine 70, which is a back picker made up of a horizontally supported drum 80, which carries a plurality of radial extending flexible picking fingers 81. The drum is driven by a motor 83, and is rotatably supported at its opposite ends in a frame 84.

Two light parallel rods 85 are spaced apart a distance less than the width of the shackles and extend along the conveyor line at shackle height from a point preceding the first back picking machine 70 to a point beyond the second back picking machine 71. As described in connection with the embodiment of Figure 1, the several shackles, in moving along the conveyor lines, pass between these parallel rods. The rods, since they are spaced apart less than the width of the shackle, forestall turning of the shackle which assures that the backs of the birds are in contact with the revolving drums of the two back pickers.

From the first back picking machine 70, the birds are moved to the second back picking machine 71. The second back picker consists of a frame 87, an inclined longitudinal drum 88 rotatably mounted at its opposite ends within the frame, a motor 89 for driving the drum, and a shield. The details of this second picking machine is best seen in Figure 4. The drum carries a plurality of flexible picking fingers 91 which are made of rubber. This second machine will effectively remove feathers from all the lower back of the carcass (see Figure 5), which without the incline would not be completely covered by the fingers because of the relatively small diameter drum and short fingers.

Obviously, many modifications and variations of the invention hereinbefore set forth may be made without departing from the spirit and scope thereof, and therefore, only such limitations should be imposed as are indicated in the appended claims.

We claim:

1. A method of picking the back feathers of poultry, said method comprising: moving the poultry carcass lineally and applying a lateral picking force directly to said carcass during said movement.

2. The method of claim 1 wherein the lateral picking force acts to support said carcass from below.

3. A method of defeathering poultry which comprises: suspending a poultry carcass in a substantially vertical position; conveying the carcass along a fixed path past a first station; applying at the first station a revolving picking force to substantially the whole of the vertically suspended carcass; subsequently conveying the carcass past a second picking station; applying a said second station a downwardly revolving picking force to the back of said vertically suspended carcass; thereafter moving the poultry carcass lineally past a third station and applying a lateral picking force directly to said carcass during said movement.

4. The method of claim 3 wherein the lateral picking force acts to support said carcass from below.

5. A method of defeathering poultry which comprises: suspending the carcass in a substantially vertical position; conveying the carcass along a fixed path past a first station; applying at the first station to substantially the whole carcass a revolving picking force; subsequently moving the carcass lineally past a second picking station; applying a said second picking station a lateral picking force directly to said carcass during said movement; moving said carcass to a third picking station; and thereafter applying at said third station a downwardly revolving picking force to the back of said carcass.

6. The method of claim 5 wherein the lateral picking force acts to support said carcass from below.

References Cited in the file of this patent

UNITED STATES PATENTS

| | | |
|---|---|---|
| 2,376,120 | Campbell | May 15, 1945 |
| 2,389,404 | Barker | Nov. 20, 1945 |
| 2,469,345 | Toti et al. | May 3, 1949 |
| 2,484,235 | Mead | Oct. 11, 1949 |
| 2,512,843 | Tomlinson | June 27, 1950 |
| 2,523,302 | Hunt | Sept. 26, 1950 |
| 2,596,443 | Sharp | May 13, 1952 |
| 2,603,831 | Sharp | July 22, 1952 |
| 2,663,049 | Van Dolah | Dec. 22, 1953 |